Patented Jan. 6, 1953

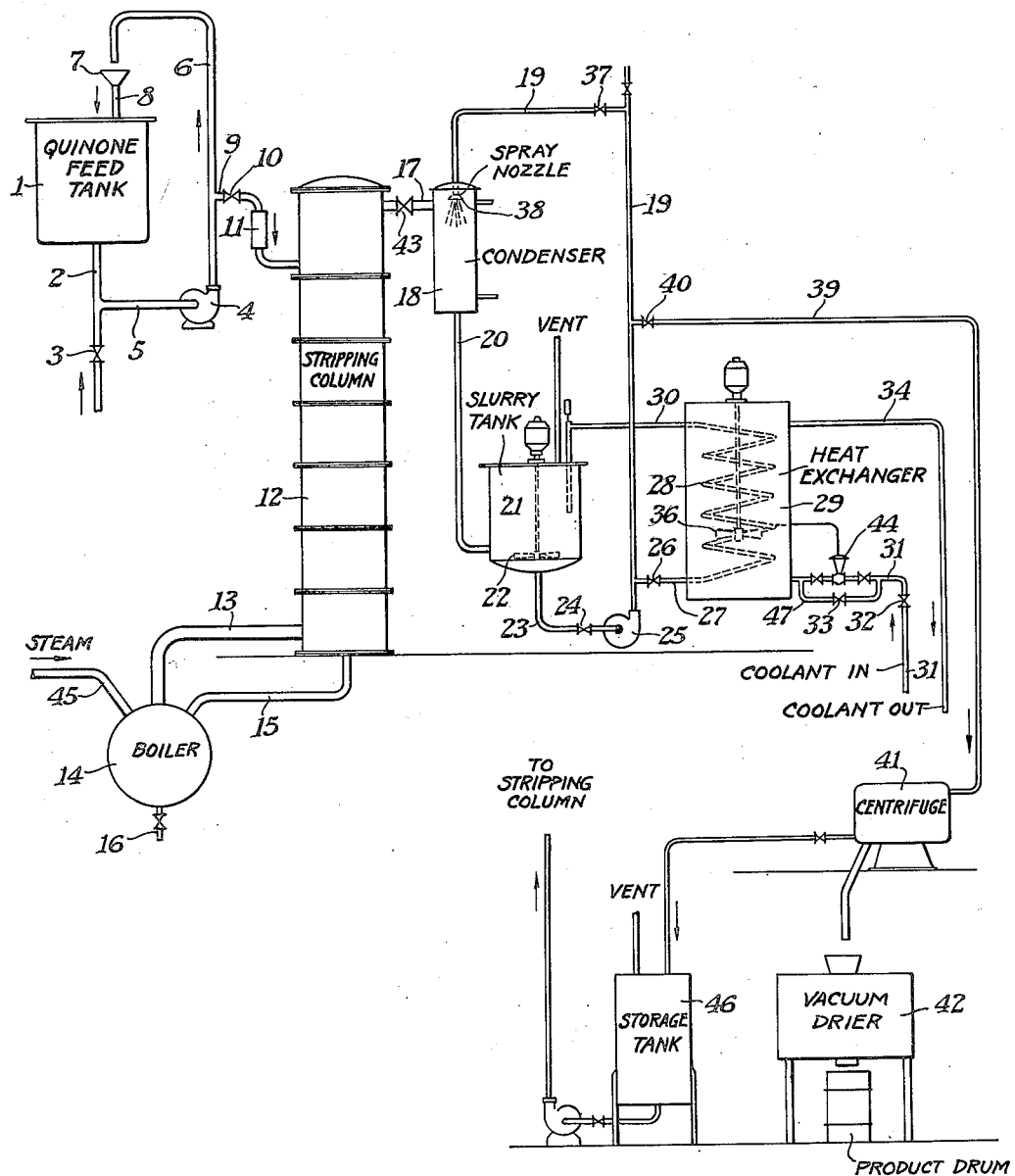

2,624,747

UNITED STATES PATENT OFFICE 2,624,747

MANUFACTURE OF QUINONE

Lee G. Davy, Kingsport, Tenn., assignor to Eastman Kodak Company, Rochester, N. Y., a corporation of New Jersey Application December 12, 1950, Serial No. 200,448

10 Claims. (Cl. 260—396)

This invention relates to the recovery of quinone from a mixture containing quinone. More specifically, it relates to the isolation of quinone, in a very pure and stable form, from quinone-laden water vapor derived from the steam distillation of a quinone-containing oxidation mixture.

Quinone is generally prepared by the oxidation of benzene or benzene compounds. Typical ways of preparing quinone include the oxidation of benzene electrolytically or by means of silver peroxide, the oxidation of aniline by manganese dioxide and sulfuric acid or by potassium dichromate and sulfuric acid, the oxidation of p-phenylenediamine, p-sulfanilic acid or p-aminophenol, for example, usually by potassium dichromate and sulfuric acid and the oxidation of hydroquinone by means of ferric chloride. This invention is especially directed to the recovery of quinone from quinone-laden water vapor derived from the steam distillation of an oxidation mixture obtained by oxidizing aniline with manganese dioxide and sulfuric acid.

As prepared by such processes, the quinone is obtained in impure form dispersed in the crude reaction mixture and must be separated therefrom and purified before being suitable for use. As noted in U. S. Patent 2,148,669, purification has been effected by steam distillation, either at ordinary or reduced pressure, or by ordinary distillation especially at reduced pressure. These types of purification processes have been generally unsatisfactory due to the fact that quinone is a solid at ordinary temperatures and is practically insoluble in cold water. When distilling the substance in order to purify it using either of the above processes, it has been found that the vaporized quinone solidifies in the condenser coating the walls with a solid scale which prevents effective condensation and causes clogging of the apparatus necessitating periodic cleaning and exposure of personnel to the harmful action of quinone. When the condenser becomes coated with quinone, the condensing action becomes inefficient and much of the quinone is kept at an elevated temperature for a rather prolonged period of time causing substantial thermal decomposition of the quinone.

Various attempts have been made to overcome the deficiencies in the processes just referred to and while improvements have been made so far as I am aware no completely satisfactory process has heretofore been devised. To illustrate in U. S. Patent 2,136,966 quinone-laden water vapor is condensed by passing into a body of water and quinone is continuously extracted from the water by circulating the water through a body of water-immiscible quinone solvent to maintain the concentration of quinone in the water so low that it will not form a cake in the condenser. This process requires a rather complex system for the crystallization of quinone from the solvent and has the economical disadvantage of solvent losses in filtering and drying of the crystallized product.

Also in U. S. Patent 1,957,484 quinone is purified by steam distilling a crude quinone mass under reduced pressure in the presence of an organic solvent for quinone which is immiscible with water but volatile with steam, and recovering quinone from the distillate. The process of this patent suffers from the disadvantages that are inherent in a process involving recovery of quinone from a solvent.

This invention has for an object to overcome the deficiencies of hitherto known processes for the purification of quinone. Another object is to provide a process for producing quinone which avoids caking of quinone in the condenser. A further object is to provide a process for preparing quinone of high purity and stability. Another object is to produce quinone of high purity and stability by a process which is economical and free from complicated recovery problems. Another object is to provide a process for preparing quinone of high purity and stability without the necessity of recrystallization.

The objects of my invention are accomplished by the following steps. Quinone-laden water vapor is introduced into a condenser wherein it is instantly condensed by contact with a cold water slurry of quinone which is rapidly circulated for the purpose of condensing the quinone-laden water vapor. From the condenser the resulting quinone-water slurry composed of the cold quinone-water slurry and condensed quinone-water vapor is led to a slurry tank which contains a body of quinone-water slurry at a lower temperature than the quinone-water slurry leaving the condenser. The quinone-water slurry in the slurry tank is maintained at the desired temperature by withdrawing quinone-water slurry from the slurry tank, cooling the withdrawn quinone-water slurry externally of the slurry tank and then returning it to the slurry tank. After the desired volume is obtained in the slurry tank the quinone-water slurry is withdrawn and the quinone is recovered, for example, by centrifuging. The centrifuged cake is then charged to a vacuum drier, where the quinone is dried at 35° C., or below. The filtrate or mother liquor from the centrifuging operation is conducted to the stripping column for removal of quinone and discarded as quinone-free water. If desired, the filtrate from the centrifuging operation can be pumped to a storage tank from which, when convenient, it may be conducted to the stripping column.

In carrying out the process of my invention, the temperature of the quinone-water slurry should not exceed 80° F. as I have discovered that if this temperature is exceeded the product obtained is inferior to that obtained when the temperature of the quinone-water slurry does not exceed 80° F. The use of temperatures not exceeding 70° F. has been found very satisfactory and is preferred. While it is known that quinone decomposes if heated to 100° C. for any material length of time, the art apparently has not appreciated that quinone of improved stability is obtained if the temperature of the quinone-water slurry does not exceed 80° F., at least for any material length of time. At slurry temperatures above 80° F. the quinone product tends to darken on storage, indicating lowered stability.

In order to enable a clear understanding of my invention, I have illustrated diagrammatically in the accompanying drawing apparatus in which my improved process can be carried out.

Referring to the drawing, reference numeral 1 designates a reservoir containing the material to be purified, such as a crude reaction mixture of quinone obtained by oxidation of aniline in accordance with U. S. Patent 2,043,912, which is introduced into the system through conduit 2 provided with valve 3. The contents of reservoir 1 are kept in suspension by pump 4 which withdraws liquid therefrom through conduit 5 and circulates it through conduit 6 to overflow 7 and conduit 8 back into the reservoir 1. From line 6, portions of the oxidation mixture are continuously withdrawn through conduit 9, valve 10, and feed glass 11 and introduced into the upper portion of stripping column 12 which is of conventional design. The lower portion of column 12 is provided with a vapor line 13 communicating with a boiler 14 which supplies a source of steam to the stripping column 12. Conduit 15, communicating with the bottom of stripping column 12 and with boiler 14, serves to convey reflux and undistilled residue into boiler 14 from which it may be periodically removed through valve 16. Steam is introduced into boiler 14 through conduit 45 and travels through vapor line 13 and up through stripping column 12. The ascending steam entrains quinone and the vapor mixture passes through conduit 17 provided with valve 43 into condenser 18 provided with conduit 19 for the introduction of a cold quinone-water slurry which instantly condenses the quinone-laden water vapor entering condenser 18 through conduit 17. The quinone-water slurry and condensed quinone-laden water vapor is conducted from condenser 18 through conduit 20 to a slurry tank 21 equipped with a stirrer 22 containing a cooled body of quinone-water slurry. The slurry in tank 21 is maintained at the desired temperature by withdrawing slurry through conduit 23 and valve 24 and pumping it by means of pump 25 through valve 26, and conduit 27 into a coil 28 in heat exchanger 29 and from there through conduit 30 to the slurry tank 21.

A coolant is admitted to heat exchanger 29 through conduit 31 provided with valve 32. Conduit 31 is also provided with a temperature-controlling valve 44 which, as the temperature of the coolant in heat exchanger 29 rises above a certain predetermined point, opens to allow coolant to flow into the heat exchanger 29. As cold coolant enters heat exchanger 29, an equal volume of warmer coolant in the heat exchanger overflows through "coolant out" line 34. Thus cold coolant enters and warm coolant leaves the heat exchanger 29, thereby controlling the temperature in heat exchanger 29. Heat exchanger 28 is also provided with a stirrer 36 for agitating the coolant therein. A by-pass line 47 having a valve 33 is provided for use in case the temperature-controlling valve 44 should get out of order. During normal operation valve 33 is closed.

As known to those skilled in the art to which this invention is directed, any suitable liquid can be used as a coolant. Thus, calcium chloride brine is suitable and was the coolant used in carrying out the operations described hereinafter but other coolants such as sodium chloride brine or diethylene glycol, for example, can be used.

Conduit 23, valve 24, pump 25, conduit 19 and valve 37 are provided for circulating cooled quinone-water slurry from slurry tank 21 to condenser 18. The cooled slurry is admitted to condenser 18 through conventional means for obtaining intimate and thorough contact such as a spray nozzle or jet 38. When desired, quinone-water slurry from slurry tank 21 is withdrawn by means of conduit 23, valve 24, pump 25, conduit 19, valve 40 and conduit 39 and centrifuged in centrifuge 41. The mother liquor or filtrate from the centrifuge is either returned directly (by means not shown) to the stripping column 12 or pumped to a storage tank 46 and returned to the stripping column 12 when convenient. The centrifuged cake is charged to a vacuum drier 42 where the quinone is dried at 35° C., or below, and then collected in a product drum. The mother liquor storage tank 46 need not be refrigerated provided the mother liquor is not stored for extended periods of time.

In operation, the crude oxidation mixture containing quinone is introduced into reservoir 1 through valve 3 in conduit 2. Valve 3 is then closed and circulating pump 4 put into operation in order to maintain the quinone in suspension in feed tank 1. Steam is introduced into boiler 14 through conduit 45 and travels through vapor line 13 and up through stripping column 12. From circulating line 6 the oxidation mixture is withdrawn through conduit 9 and feed glass 11 and introduced into stripping column 12. The quinone-laden water vapor resulting from the steam distillation of the oxidation mixture in the stripping column 12 is conducted to the condenser 18 where the quinone-laden water vapor is instantly condensed and the quinone crystallized by the cold quinone-water slurry which is introduced into the condenser 18. The proportion of quinone-laden water vapor to cold quinone-water slurry is such that the quinone-water slurry formed in the condenser 18 leaves the condenser at only a few degrees higher temperature than the cold quinone-water slurry entering the condenser. From condenser 18 the quinone-water slurry is conducted to the slurry tank 21 where it is intimately mixed with a relatively large volume of a colder quinone-water slurry. A circulating pump 25 of high head and capacity continuously withdraws quinone-water slurry from the slurry tank 21, circulates it through the heat exchanger 29 where the slurry is cooled only a few degrees, but sufficiently to maintain the temperature of the slurry in the slurry tank at the desired level, and returns it to the slurry tank. The circulating pump 25 also serves to withdraw cold slurry from the slurry tank and circulates it through the condenser 18.

As shown in the drawing, the slurry tank 21 and the storage tank 46 are each provided with a vent which is joined to a ventilation system (not shown). These vents are provided for the safe removal of toxic quinone vapors.

The quinone-water slurry should be circulated through the coil 28 at a rate high enough to produce sufficient turbulence that a quinone scale will not form on the inside of the coil.

For purposes of illustration, but without intending to be limited thereto, slurry velocities in the range of about 10 to 20 feet per second through the coil 28 produce the turbulence necessary to prevent a quinone scale from forming on the inside of the tube or coil 28. Higher velocities than those stated can be used but velocities in excess of 20 feet per second increase the pumping power required inordinately. Similarly, I have found that the temperature differential between the slurry and the coolant should not exceed 15° F. If this differential exceeds 15° F., the inside of the tube tends to become coated with quinone and further heat transfer tends to be impeded.

In one actual operation the temperature of the coolant in heat exchanger 28 was maintained at 59.5° F., the temperature of the slurry in the slurry tank was 69.7° F. and the temperature of the slurry leaving the heat exchanger 28 was 67.1° F. The valve in line 19 to the spray nozzle or ejector 38 was regulated to maintain these conditions while the automatic temperature controller 44 maintained the brine temperature in the heat exchanger.

In another actual operation the temperature of the coolant in heat exchanger 28 was maintained at 58.0° F., the temperature of the slurry in the slurry tank was 66.4° F. and the temperature of the slurry leaving the heat exchanger 28 was 64.3° F.

Operating under conditions similar to those above, a total of 145 gallons of slurry was delivered to the centrifuge. Upon centrifuging, 180.5 lbs. of wet quinone were obtained which, when dried at 25° C. and 15 mm. of mercury total pressure, yielded 139 lbs. of bone-dry quinone. The quinone product thus obtained was a bright canary-yellow in color and melted at 113.8° C.-115.8° C.

The quinone-water slurry used in the process just as it is started is ordinarily obtained from the preceding run. If a slurry is not available water and quinone could be mixed to form a slurry but it is not necessary to do this as water alone can be used in the slurry tank at the start of the process. Ordinarily, the composition of the slurry varies from about 6 to 15 parts by weight of water per part of quinone.

It is here noted that while it is stated hereinbefore that the quinone is vacuum-dried at 35° C., or less, the temperature given refers to the temperature of the heating medium supplied to the drier and not to the contents of the drier. The drying of quinone is old in the art and the manner in which it is dried is not part of my invention, except that in accordance with the teachings of my invention the quinone should not be heated above 80° F., at least for any appreciable length of time.

Condensation of the quinone-laden water vapor at temperatures below 80° F., preferably below 70° F., prevents the formation of tar at the time of condensation. When quinone condensation is carried out at temperatures above 80° F., although the tar formation might be negligible, the residues so formed react in time to polymerize with more quinone, resulting in a dark product. This is a primary disadvantage of earlier processes in which the quinone product has to be purified, as by crystallization, in order to reach a high degree of purity and stability. In contrast thereto, my process yields a product which, on centrifuging and drying, is of high purity and stability, without further treatment.

From the foregoing it will be apparent that the process of the present invention has at least three important features. One, quinone-laden water vapor is instantly condensed by contact with a quinone-water slurry. Two, the purification process is carried out while maintaining the temperature of the quinone below 80° F. Three, the temperature of the quinone-water slurry is maintained at a temperature below 80° F., preferably below 70° F., by cooling quinone-water slurry externally of the slurry tank and returning the cooled slurry to the slurry tank.

By means of my process, quinone of high purity and stability is obtained without the necessity of recrystallization. Additionally, the process is economical and free from complicated recovery problems. Furthermore, my process enables quinone to be purified substantially automatically with little or no exposure of personnel to its toxic properties.

The term quinone as used herein and in the claims refers to p-benzoquinone.

I claim:

1. The process which comprises condensing quinone-laden water vapor by direct contact with a quinone-water slurry, conveying the resulting quinone-water slurry to a slurry tank containing a body of quinone-water slurry, withdrawing quinone-water slurry from said slurry tank and recovering quinone therefrom and wherein said process is carried out while maintaining the quinone-water slurry at a temperature not exceeding 80° F.

2. The process which comprises condensing quinone-laden water vapor by direct contact with a quinone-water slurry, conveying the resulting quinone-water slurry to a slurry tank containing a cooler body of quinone-water slurry, withdrawing quinone-water slurry from said slurry tank, cooling said withdrawn quinone-water slurry and directly returning it to said slurry tank, withdrawing quinone-water slurry from said slurry tank and using it to condense the quinone-laden water vapor by direct contact therewith, withdrawing quinone-water slurry from said slurry tank and recovering quinone therefrom and wherein said process is carried out while maintaining the quinone-water slurry at a temperature not exceeding 80° F.

3. The process which comprises subjecting an oxidation mixture containing quinone to steam distillation whereby quinone-laden water vapor is formed, instantly condensing the quinone-laden water vapor in a separate zone by direct contact with a quinone-water slurry, conveying the resulting quinone-water slurry to a slurry tank containing a body of quinone-water slurry, withdrawing quinone-water slurry from said slurry tank, cooling said withdrawn quinone-water slurry and directly returning it to said slurry tank, withdrawing quinone-water slurry from said slurry tank and using it to condense said quinone-laden water vapor by direct contact therewith and withdrawing quinone-water slurry from said slurry tank and recovering quinone therefrom and wherein said process is carried out while maintaining the quinone-water slurry at a temperature not exceeding 80° F.

4. The process which comprises subjecting an oxidation mixture containing quinone to steam distillation whereby quinone-laden water vapor is formed, instantly condensing the quinone-laden water vapor in a separate zone by direct contact with a cold quinone-water slurry, conveying the resulting quinone-water slurry to a slurry tank containing a body of quinone-water slurry, continuously withdrawing quinone-water slurry from said slurry tank, cooling said withdrawn quinone-water slurry and directly returning it to said slurry tank, continuously withdrawing quinone-water slurry from said slurry tank and using it to condense said quinone-laden water vapor by direct contact therewith and withdrawing quinone-water slurry from said slurry tank and recovering quinone therefrom and wherein said process is carried out while maintaining the quinone-water slurry at a temperature not exceeding 80° F.

5. The process which comprises subjecting an oxidation mixture containing quinone to steam distillation whereby quinone-laden water vapor is formed, instantly condensing the quinone-laden water vapor in a separate zone by direct contact with a cold quinone-water slurry, conveying the resulting quinone-water slurry to a slurry tank containing a body of quinone-water slurry, continuously withdrawing quinone-water slurry from said slurry tank, cooling said withdrawn quinone-water slurry and directly returning it to said slurry tank, continuously withdrawing quinone-water slurry from said slurry tank and using to condense said quinone-laden water vapor by direct contact therewith and withdrawing quinone-water slurry from said slurry tank and recovering quinone therefrom and wherein said process is carried out while maintaining the quinone-water slurry at a temperature not exceeding 70° F.

6. The process which comprises subjecting an oxidation mixture containing quinone to steam distillation whereby quinone-laden water vapor is formed, instantly condensing the quinone-laden water vapor in a separate zone by direct contact with a cold quinone-water slurry, conveying the resulting quinone-water slurry to a slurry tank containing a body of quinone-water slurry, continuously withdrawing quinone-water slurry from said slurry tank, cooling said withdrawn quinone-water slurry and directly returning it to said slurry tank, continuously withdrawing quinone-water slurry from said slurry tank and using it to condense said quinone-laden water vapor by direct contact therewith and when said slurry tank has filled up to the desired volume withdrawing quinone-water slurry from said slurry tank and recovering quinone therefrom and wherein said process is carried out while maintaining the quinone-water slurry at a temperature not exceeding 80° F.

7. The process which comprises subjecting an oxidation mixture containing quinone to steam distillation whereby quinone-laden water vapor is formed, instantly condensing the quinone-laden water vapor in a separate zone by direct contact with a cold quinone-water slurry, conveying the resulting quinone-water slurry to a slurry tank containing a body of quinone-water slurry, continuously withdrawing quinone-water slurry from said slurry tank, cooling said withdrawn quinone-water slurry and directly returning it to said slurry tank, continuously withdrawing quinone-water slurry from said slurry tank and using it to condense said quinone-laden water vapor by direct contact therewith and when said slurry tank has filled up to the desired volume withdrawing quinone-water slurry from said slurry tank and recovering quinone therefrom and wherein said process is carried out while maintaining the quinone-water slurry at a temperature not exceeding 70° F.

8. The process which comprises subjecting an oxidation mixture containing quinone to steam distillation whereby quinone-laden water vapor is formed, instantly condensing the quinone-laden water vapor in a separate zone by direct contact with a cold quinone-water slurry, conveying the resulting quinone-water slurry to a slurry tank containing a body of quinone-water slurry, continuously withdrawing quinone-water slurry from said slurry tank, cooling said withdrawn quinone-water slurry by passing it through a coil in indirect contact with a coolant with sufficient turbulence to prevent quinone from depositing on the inside of the coil and wherein the temperature differential between the quinone-water slurry and the coolant does not exceed 15° F. and directly returning the cooled quinone-water slurry to said slurry tank, continuously withdrawing quinone-water slurry from said slurry tank and using it to condense said quinone-laden water vapor by direct contact therewith and withdrawing quinone-water slurry from said slurry tank and recovering quinone therefrom and wherein said process is carried out while maintaining the quinone-water slurry at a temperature not exceeding 80° F.

9. In a process for recovering quinone from an oxidation mixture containing quinone wherein the quinone oxidation mixture is steam-distilled to obtain quinone-laden water vapor which is instantly condensed by direct contact with a quinone-water slurry and quinone is recovered from the resultant quinone-water slurry the improvement which comprises carrying out the recovery process while maintaining the quinone-water slurry at a temperature not exceeding 80° F.

10. In a process for recovering quinone from an oxidation mixture containing quinone wherein the quinone oxidation mixture is steam-distilled to obtain quinone-laden water vapor which is instantly condensed by direct contact with a quinone-water slurry and quinone is recovered from the resultant quinone-water slurry the improvement which comprises carrying out the recovery process while maintaining the quinone-water slurry at a temperature not exceeding 70° F.

LEE G. DAVY.

REFERENCES CITED

The following references are of record in the file of this patent:

UNITED STATES PATENTS

| Number | Name | Date |
|---|---|---|
| 2,071,329 | Brown | Feb. 23, 1937 |
| 2,128,323 | Rogers | Aug. 30, 1938 |